United States Patent [19]
Wong

[11] Patent Number: 5,713,292
[45] Date of Patent: Feb. 3, 1998

[54] PUCKER FREE POCKET GARMENT SEAM AND METHOD FOR PRODUCTION

[75] Inventor: John Wong, Montreal, Canada

[73] Assignee: Tal Apparel Ltd., Kowloon, Hong Kong

[21] Appl. No.: 779,096

[22] Filed: Jan. 6, 1997

Related U.S. Application Data

[63] Continuation-in-part of Ser. No. 613,656, Mar. 11, 1996, Pat. No. 5,590,615, which is a continuation of Ser. No. 245,122, May 17, 1994, Pat. No. 5,568,779.

[51] Int. Cl.⁶ .............................. D05B 1/18; A41D 27/20
[52] U.S. Cl. .................. 112/441; 112/475.09; 2/247; 2/275; 156/93
[58] Field of Search ........................ 112/441, 475.09, 112/426, 423; 2/115, 122, 275, 247, 248, 251; 156/93

[56] References Cited

U.S. PATENT DOCUMENTS

| | | |
|---|---|---|
| 1,706,461 | 3/1929 | Oathout . |
| 1,784,942 | 12/1930 | Miller . |
| 2,120,458 | 6/1938 | Bodle . |
| 2,264,224 | 11/1941 | Swan . |
| 2,266,953 | 12/1941 | Blue . |
| 2,719,803 | 10/1955 | Nottebohm . |
| 2,731,788 | 1/1956 | Donaldson, Jr. . |
| 2,925,642 | 2/1960 | Pfeffer, Jr. . |
| 2,937,380 | 5/1960 | Reese . |
| 2,988,457 | 6/1961 | Gatcomb . |
| 3,094,705 | 6/1963 | Reid et al. . |
| 3,399,642 | 9/1968 | Etchison et al. . |
| 3,453,662 | 7/1969 | Weiss . |
| 3,500,560 | 3/1970 | Drazen ............................ 112/475.09 |
| 4,077,066 | 3/1978 | Weiss . |
| 4,549,916 | 10/1985 | Off et al. . |
| 4,561,128 | 12/1985 | Zimmerman . |
| 4,803,109 | 2/1989 | Saniscalchi . |
| 5,003,902 | 4/1991 | Benstock et al. . |
| 5,063,101 | 11/1991 | Grynaeus et al. . |
| 5,568,779 | 10/1996 | Wong . |
| 5,590,615 | 1/1997 | Wong . |

FOREIGN PATENT DOCUMENTS 1104802  12/1958  Germany .

Primary Examiner—Ismael Izaguirre
Attorney, Agent, or Firm—Bradford E. Kile

[57] ABSTRACT

A pucker free pocket seam for a shirt providing the shirt with a tailored and wrinkle free appearance. The pucker free seam and method for production utilizes a bonding strip which contains at least a thermal adhesive component which is inserted between folded portions of a first garment component along a seam. A sufficient amount of heat and pressure is applied to the seam which causes the adhesive of the bonding strip to flow onto the surfaces of the folded portions of the first garment component thereby creating a compressed seam and permanently bonding the folded portions of the first garment component together along the seam to eliminate puckering associated with shrinkage of the sewing thread at the seam.

19 Claims, 2 Drawing Sheets

PUCKER FREE POCKET GARMENT SEAM AND METHOD FOR PRODUCTION

RELATED INVENTION

This application is a continuation-in-part of applicant's prior application Ser. No. 613,656 filed Mar. 11, 1996, entitled "Pucker Free Garment Seam and Method of Manufacture" now U.S. Pat. No. 5,590,615 which is a continuation of applicant's prior application Ser. No. 245,122 filed May 17, 1994 entitled "Pucker Free Garment Seam and Method of Manufacture" now U.S. Pat. No. 5,568,779 all of common assignment herewith.

BACKGROUND OF THE INVENTION

The present invention relates to a pucker free garment seam and method for production. More specifically, the invention is directed to an improved pocket garment seam and method for production which facilely eliminates a tendency of the seam to bunch or pucker at a pocket attachment area and other similar areas following conventional laundering procedures.

A puckering phenomenon at seam lines has long plagued the garment industry. Seam pucker is typically caused by thread shrinkage which occurs during laundering of a garment. In particular, after a garment is purchased by a garment consumer it is subjected to laundering cycles as the shirt is worn and becomes soiled. During these laundering and drying cycles the sewing thread typically undergoes longitudinal shrinkage. It is this shrinkage, at a rate greater than the surrounding shirt material that creates puckering at a seam joining two panels of fabric. In this, the sewing thread contracts upon being laundered and pulls on opposing garment components at the garment seam which in turn causes the garment components to buckle and thereby create wrinkles along the garment seam. This effect is noticeable in the seams of a dress shirt pocket. Accordingly, it would be highly desirable to provide a method for production and garment which would be free of pucker phenomenon in the pocket region of a shirt. Moreover, it would be desirable to maintain a pocket seam of a shirt, or the like, which would be smooth and pucker free even after multiple laundering operations.

Several attempts have been made to reduce seam pucker in dress shirts. One attempt utilizes an interlining having a thermoplastic component in the interlining matrix. During the manufacture process the seam is ironed which reduces the cross-sectional thickness of the seam along the stitch line. The reduced thickness allows for slack in the sewing thread such that during subsequent laundering the sewing thread is permitted to shrink an amount equal to the slack. This technique is not entirely effective in reducing seam pucker. First, the garment components sewn together at the seam are allowed to pull apart between outer stitches of the seam which results in buckling of the garment fabric. Second, the thread which is compressed in the interlining matrix becomes bound within the matrix thus shrinkage of the thread still results in at least a degree of seam pucker. Third, manufacturing an interlining results in an overall increase in garment manufacturing cost. This cost is compounded if the interlining is a composite interlining.

Another prior attempt at reducing seam pucker utilizes special garment material. Specifically, the garment components sewn together at the seam are manufactured from material which stretches during the sewing process and which relaxes after the sewing process is complete. This relaxation provides for slack in the sewing thread. This attempt is also ineffective at reducing seam pucker. First, as before, the garment components sewn together at the seam are allowed to pull apart between outer stitches of the seam which results in buckling of the garment fabric. Second, only garments manufactured from certain stretch materials may be utilized to manufacture the garments. The disadvantages associated with this are clear.

Still other prior art attempts alter the nature of the sewing thread used in the sewing process. For example, one such attempt utilizes a composite sewing thread whereby one component of the thread is water soluble. During the laundering process the water soluble component dissolves thereby creating slack in the sewing thread which compensates for thread shrinkage. First, as before, the garment components sewn together at the seam are allowed to pull apart between outer stitches of the seam which results in buckling of the garment fabric. Second, the high cost of manufacturing a sewing thread altered in this way increases the overall garment cost. Third, thread strength can be compromised by such composite design. Last, commercial sewing machines are not well adapted to utilize altered thread. Other prior art attempts which alter the nature of the sewing thread are not believed to be fully effective for the same noted reasons.

The difficulties and limitations suggested in the preceding are not intended to be exhaustive, but rather are among many which demonstrate that although significant attention has been devoted to reducing pucker in garment seams, puckerless garment seams and method for production appearing in the past will admit to worthwhile improvement.

OBJECTS AND BRIEF SUMMARY OF THE INVENTION

It is therefore a general object of the invention to provide a novel, smooth garment seam at a pocket region of a shirt and method for production which will obviate or minimize difficulties of the type previously described.

It is a specific object of the invention to provide a smooth garment seam and method for production which will eliminate seam pucker at a pocket region of a shirt.

It is another object of the invention to provide a smooth garment seam and method for production which may be used in a variety of garments to provide a pucker free tailored appearance.

It is still another object of the invention to provide a smooth garment seam and method for production for advantageous use in a pocket seam of a dress shirt.

It is yet another object of the invention to provide a smooth pocket garment seam and method for production which provides for a cost effective solution to seam pucker and does not involve significant modification of existing manufacturing apparatus.

BRIEF SUMMARY OF A PREFERRED EMBODIMENT OF THE INVENTION

A preferred embodiment of the invention which is intended to accomplish the foregoing objects includes a bonding strip which contains at least a thermal adhesive component which is inserted between two surfaces along a seam line of a garment. The seam is subjected to a sufficient amount of heat and pressure to cause the adhesive of the bonding strip to flow over the surfaces of the garment component thereby creating a compressed seam and permanently bonding the first garment component together along the seam to eliminate puckering associated with sewing thread shrinkage.

DRAWINGS

Other objects and advantages of the present invention will become apparent from the following detailed description of a preferred embodiment thereof taken in conjunction with the accompanying drawings, wherein.

DETAILED DESCRIPTION

Figure 1:
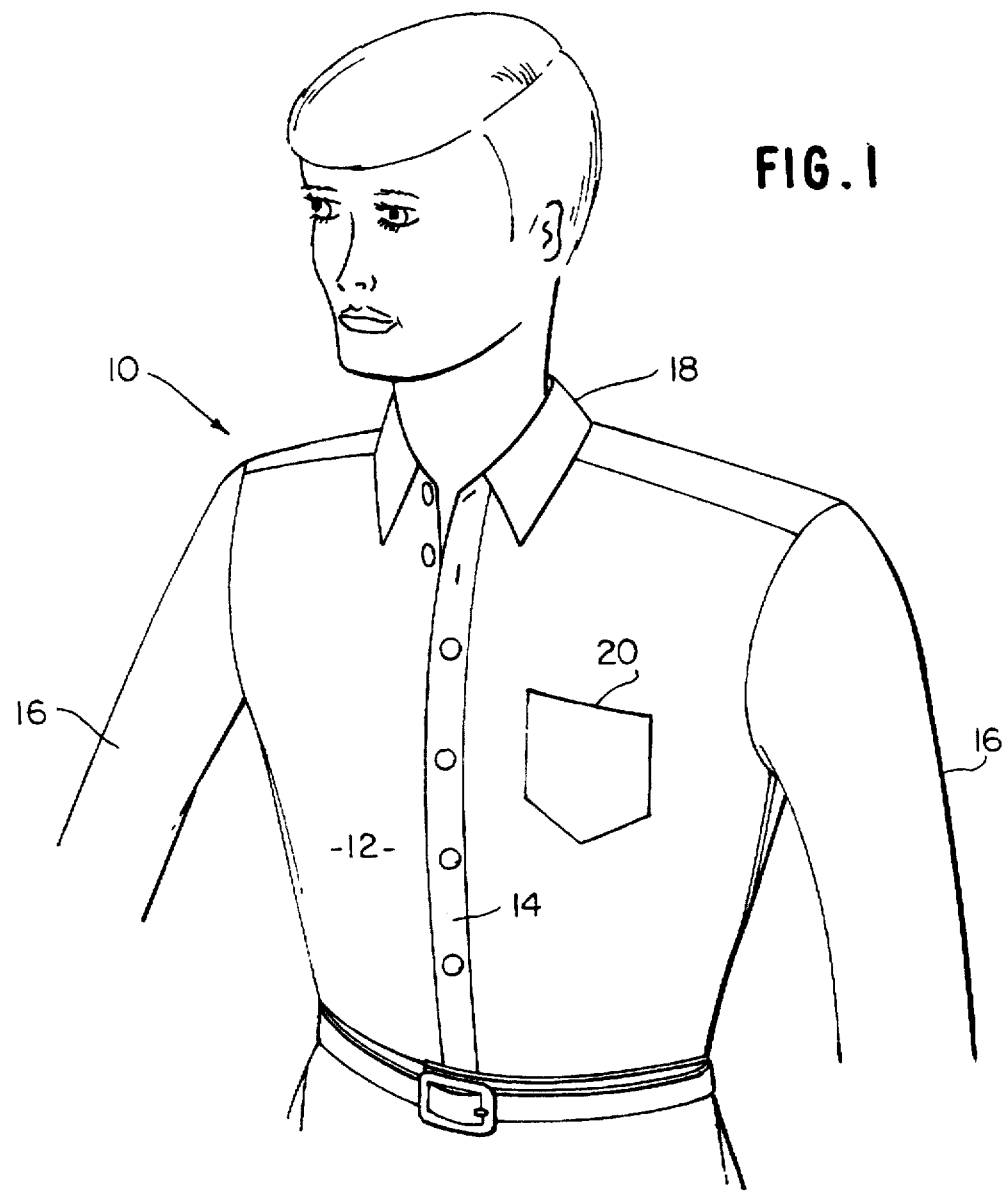
FIG. 1 is a pictorial view showing a human male figure wearing a shirt having at least a pocket seam produced in accordance with the present invention.
Figure 2:
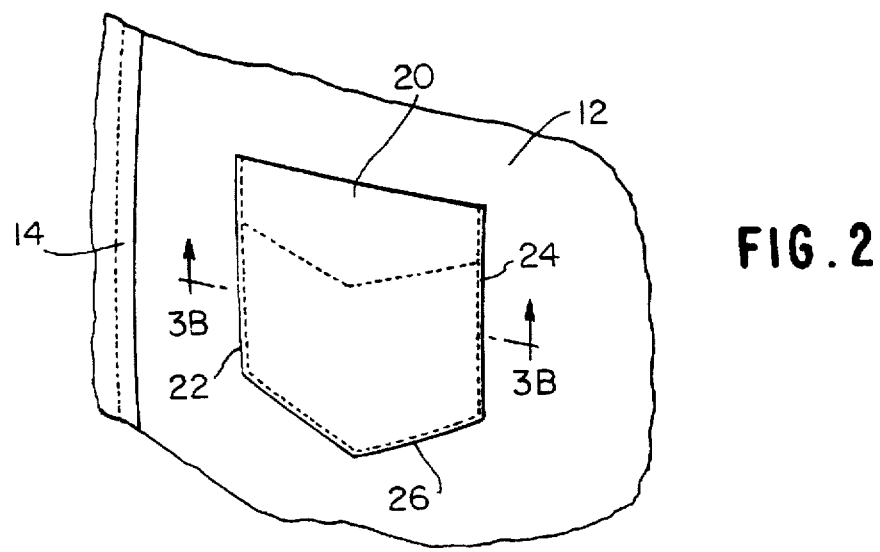
FIG. 2 is a segmental detail view showing a pocket seam of the dress shirt depicted in FIG. 1 in which the pocket seam has been produced in accordance with the present invention.

Referring now to the drawings and particularly to FIG. 1, there is shown a human figure wearing a dress shirt 10 having front panel sections 12, a central bottom placket 14, sleeves 16 and a collar 18 and a pocket 20. FIG. 2 shows a more detailed segment of the dress shirt 10 and pocket region of the shirt. The pocket 20 is connected to the front panel 12 along a pocket seam in accordance with a preferred embodiment of the invention. The phenomenon of seam pucker is troubling in pocket seams because of its highly visible location.

Figure 3A:
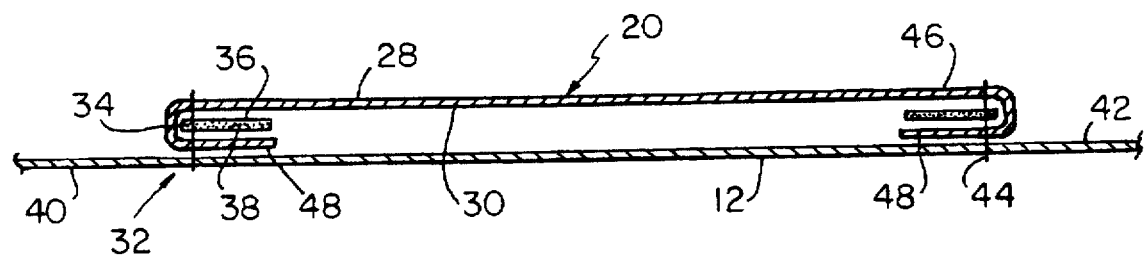
FIGS. 3a and 3b show cross-sectional views of a method for producing a dress shirt pocket seam and the pocket seam in accordance with the present invention.
Figure 3B:
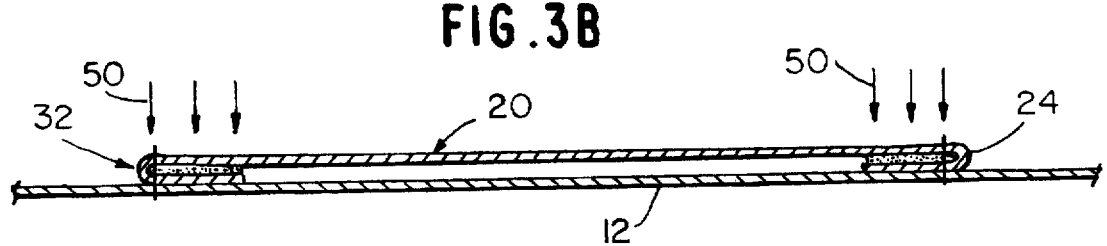

FIGS. 3a and 3b show steps for producing the pocket seam of the present invention. FIG. 3b shows a cross-sectional view of a completed pocket seam produced in accordance with the present invention. In the pocket seam embodiment of the present invention, a first garment component 20 comprises a pocket having two substantially parallel side edges 22 and 24 and a bottom portion 26. This garment component 20 has a first or upper or outer surface 28 and a second or lower or inner surface 30. A seam 32 extends about the pocket 20 and attaches the pocket to the front panel 12 of the shirt.

A bonding strip 34 forms an integral part of the present invention and is coextensive with the generally "U-shaped" seem of the pocket. The bonding strip has a first or upper or outer surface 36 and a lower surface 38. In a preferred embodiment of the invention, and as shown in the Figures, the bonding strip 34 comprises an adhesive web consisting entirely of an adhesive material. The adhesive material is preferably composed of a polyamide, polyester, or an olefinic material such as a low density polyethylene. Other thermoplastic materials such as polyurethane and ethylene vinylacetate copolymer can also be used. The aforementioned adhesives are preferable because they all have a low melting point in the range of 60–160 degree celsius. In the preferred embodiment, the adhesive web is produced from a plurality of filaments having a diameter ranging between 20–80 microns. Furthermore, the adhesive web of the present invention has a density of approximately 10–100 grams per square meter. Alternatively, a more solid structured net adhesive may be used having a density preferably in a range of 8–80 grams per square meter. Other types of adhesives are also contemplated in the present invention provided that they are capable of bonding to the surface of cloth material and are resistant to laundering operations.

The first edge 22 of the pocket or first garment component 20 is reverse folded around the bonding strip 34, the second edge 24 of the first garment component 20 is reverse folded around the bonding strip 34 and the bottom edge 26 of the first garment component is reverse folded around the bonding strip 34. The first and second garment component 20 and 40 are positioned as in FIG. 3a such that a first or outer surface 42 of the shirt abuts the first surface 28 of the reverse folded portions 22, 24 and 26 of the first garment component 20.

A stitch 44 is sewn along the edge of the pocket traversing through an unfolded portion 46 of the first garment component 20, the bonding strip 34, the reverse folded portion 48 of the first garment component 20, and the second garment component 40.

The production of the improved seam of the present is completed with the application of heat and schematically illustrated by directional arrows 50 in FIG. 3b. This process is usually carried out on a heated press with a temperature of 60 to 160 degrees celsius for 5 to 10 seconds followed with a vacuum step to cool and set the adhesive. The applied heat and pressure 50 cause the adhesive strip 34 to melt and flow onto the surface 30 of the first or pocket component 20. That is, the adhesive flows onto the lower surface 30 of the first garment component 20 at the reversely bent positions about the pocket from both the first 36 and second 38 surfaces of the bonding strip 34. During the ironing/pressing process 50, the flowing adhesive becomes interposed within the interstices of the garment fabric of the first component 20 and the thread 44 of the peripheral stitch of the pocket. This creates a very strong bond along the seam. This bond prevents relative motion and seam pucker during subsequent laundering operations. In particular, because the first garment component 20 is bonded together along the peripheral seam of the pocket, it cannot pull apart during laundering and, therefore, buckling of the seam fabric will be prevented. This is a significant advantage over the prior art seams which permit the fabric layers to become separated during subsequent laundering operations which in turn results in seam pucker. The ironing/pressing process also compresses seam 32 to reduce the seam thickness.

The reverse folded portions of the first garment component 20 are at the visible portions of the pocket seam. For maximum prevention of pucker it is important to have the adhesive or bonding strips 34 flow over the entire inner surfaces of the reverse folded portions of the first garment component 20. This will ensure complete bonding of the outer or unfolded portions 46 of the first garment component 20 to the reverse folded portions 48 of the first garment component 20 and the penetrating stitch 44.

Although in the preferred embodiment the bonding strip 34, comprises an adhesive web, as described above, other elements are contemplated. In an alternative embodiment the bonding strip may comprise an interlining having an adhesive coating on its outer surfaces. Interlinings are known in the art to provide stiffness to garment components. For example, interlinings are used in shirt collars and center plackets to provide a degree of stiffness. However, the interlining of the present invention utilizes an adhesive on its outer surfaces and is specifically used for garment seams. More specifically, the interlining body of the present invention is preferably a woven interlining made from cotton or a polyester/cotton blend. Alternatively, a nonwoven interlining body made from polyester, nylon, viscose or blends of these materials may be used. Preferably, the interlining body is fabricated from a single material so as to avoid the cost associated with producing composite interlinings. The interlining is provided with a coating of an adhesive on an upper and lower surface. The adhesive is preferably one of the same thermal adhesives previously mentioned in the adhesive web embodiment discussed above. The adhesive may be applied on the upper and lower surfaces of the interlining as an adhesive layer or as a series of adhesive dots. Significantly, a quantity of adhesive sufficient to flow over the garment surfaces as described above is needed in order to provide complete bonding as contemplated by the present invention.

Although the specific embodiment as shown in the Figures is directed to a pocket seam 32 of a dress shirt 10, it is to be understood that the seam 32 and method for production of the present invention can advantageously be utilized in a variety of garments, for example, in dress slacks.

SUMMARY OF MAJOR ADVANTAGES OF THE INVENTION

After reading and understanding the foregoing detailed description of an inventive pocket garment seam and method for production in accordance with preferred embodiments of the invention, it will be appreciated that several distinct advantages of the subject pocket seam and method for production are obtained.

Without attempting to set forth all of the desirable features of the instant pocket seam and method for production, at least some of the major advantages include providing a pucker free garment seam in the pocket of a dress shirt consisting of a first garment component 20, forming an outer element of a dress shirt pocket, a second garment component such as a dress shirt front panel, and a bonding strip interposed within reverse folded edge portion of the pocket.

Use of the bonding strip provides a pucker free pocket seam which has not been successfully accomplished by prior art attempts. Preferably, the bonding strip comprises an adhesive web which flows during ironing onto the abutting surfaces of the garment first component to create a very strong bond between the fabrics along the garment seam. This bond prevents the fabric from relative movement between the garment component and a sewing thread during subsequent laundering of the garment. Alternatively, the bonding strip consists of an interlining body having a thermal adhesive coating on its outer surface. The interlining body can be fabricated from a single material thus avoiding the use of costly composite interlining body.

The garment seam and method for production of the present invention provides for a less costly alternative to other prior art attempts at eliminating seam pucker in the pocket region of a dress shirt and without the need for substantial modification of current seam production operations.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A method for producing a pucker free garment seam joining a first garment component forming a pocket of a shirt and a second garment component forming a front panel of the shirt, said method comprising the steps:

(a) providing a first garment component having two substantially parallel side edges and a bottom edge forming a pocket of a shirt and having a first surface and a second surface;

(b) providing a second garment component forming a front panel of a shirt and having a first and a second surface;

(c) providing a bonding strip having a first and a second surface and at least a thermal adhesive component and placing the bonding strip along the side edges and bottom edge of the first garment component so as to define a seam and such that the first surface of the bonding strip contacts the second surface of the first garment component along the seam;

(d) reverse folding the side edges of the first garment component over the bonding strip such that the second surface of the side edges of the first garment component is folded over and abuts the second surface of the bonding strip along the seam;

(e) reverse folding the bottom edge of the first garment component over the bonding strip such that the second surface of the bottom edge of the first garment component is folded over and abuts the second surface of the bonding strip along the seam;

(f) placing the first garment component forming a shirt pocket in an adjacent relationship to the second garment component forming a front panel of a shirt such that the first surface of the second garment component abuts the first surfaces of the reverse folded portions of the edges of the first garment component;

(g) sewing a stitch along the bonding strip such that it traverses through at least an unfolded portion of the first garment component, the bonding strip, the reverse folded portions of the first garment component, and the second garment component;

(h) applying sufficient heat and pressure to said bonding strip to cause the thermal adhesive to melt such that the adhesive flows onto the stitching around the pocket and the second surface of the first garment component along the first surface of the bonding strip and concomitantly along the second surface of the bonding strip to the second surface of the reverse folded edges of the first garment component to provide a bond along the pocket seam such that the bonded component will effectively reduce a tendency of the seam to exhibit pucker following laundering operations.

2. A method for producing a pucker free garment seam joining a first garment component forming a pocket of a shirt and a second garment component forming a front panel of the shirt as defined in claim 1 wherein:

said steps of placing a bonding strip comprise placing an adhesive composed of a thermoplastic material.

3. A method for producing a pucker free garment seam joining a first garment component forming a pocket of a shirt and a second garment component forming a front panel of the shirt as defined in claim 1 wherein:

said steps of placing a bonding strip comprise placing a thermal adhesive having a melting point ranging from approximately 60 to 160 degrees celsius.

4. A method for producing a pucker free garment seam joining a first garment component forming a pocket of a shirt and a second garment component forming a front panel of the shirt as defined in claim 1 wherein:

said steps of placing a bonding strip comprise placing a thermal adhesive net having a density of approximately 8 to 80 grams per square meter.

5. A method for producing a pucker free garment seam joining a first garment component forming a pocket of a shirt and a second garment component forming a front panel of the shirt as defined in claim 1 wherein:

said step of applying heat and pressure comprises the steps of ironing and pressing at a temperature between 60 to 160 degrees celsius for 5 to 10 seconds.

6. A method for producing a pucker free garment seam joining a first garment component forming a pocket of a shirt and a second garment component forming a front panel of the shirt as defined in claim 1 wherein:

said steps of placing a bonding strip comprise placing a bonding strip between the reverse folded second surface of the first garment component a thermal adhesive web or net composed entirely of a thermal adhesive.

7. A method for producing a pucker free garment seam joining a first garment component forming a pocket of a shirt and a second garment component forming a front panel of the shirt as defined in claim 6 wherein:

said steps of placing a bonding strip comprise placing a thermal adhesive web composed of a plurality of adhesive filaments having a diameter ranging approximately between 20 to 80 microns.

8. A method for producing a pucker free garment seam joining a first garment component forming a pocket of a shirt and a second garment component forming a front panel of the shirt as defined in claim 1 wherein:

said steps of placing a bonding strip comprise placing an interlining having a quantity of thermal adhesive on first and second surfaces.

9. A method for producing a pucker free garment seam joining a first garment component forming a pocket of a shirt and a second garment component forming a front panel of the shirt as defined in claim 1 wherein:

said step of sewing comprises sewing through the unfolded portion of the first garment component, the bonding strip, the reverse folded over edge portions of the first garment component, and the second garment component.

10. In a shirt having a first component, forming a pocket of the shirt and a second component forming a front panel of the shirt, joined together in a pucker free seam, as defined in claim 1 wherein:

said bonding strip comprises an interlining having on upper and lower surfaces a quantity of thermal adhesive.

11. In a shirt having a first component, forming a pocket of the shirt and a second component forming a front panel of the shirt, joined together in a pucker free seam, as defined in claim 1 wherein:

said stitch traverses through the unfolded portion of the first garment component, the bonding strip, the reverse folded portion of the first garment component, and the second garment component.

12. In a shirt having a first component, forming a pocket of the shirt and a second component forming a front panel of the shirt, joined together in a pucker free seam, as defined in claim 1 wherein:

said bonding strip comprises a generally rectangular strip positioned between the reverse folded second surfaces of the first garment component without forming a fold in the rectangular strip.

13. In a shirt having a first component, forming a pocket of the shirt, and a second component, forming a front panel of the shirt, joined together in a pucker free seam, said pucker free seam comprising:

a first garment component having two substantially parallel side edges and a bottom edge forming a pocket of a shirt and having a first surface and a second surface;

a second garment component forming a front panel of a shirt and having a first and a second surface;

a bonding strip having at least a thermal adhesive component and having a first and a second surface;

the side edges and bottom edge of the first garment component forming a pocket of a shirt being reverse folded over the bonding strip such that a portion of the second surface of the first garment component is bonded to the second surface of the bonding strip and an unfolded edge portion of the second surface of the edges of the first garment component is bonded to the first surface of the bonding strip;

a stitch extending along the edges of the first garment component and traversing through at least the unfolded portion of the first garment component, the bonding strip, the reverse folded portions of the first garment component, and the second garment component;

wherein bonding the seam comprises subjecting the seam to a sufficient amount of heat and pressure to cause the bonding strip to bond to the stitches and at its second surface to the second surface of the reverse folded portions of the first garment component and concomitantly at the first surface of the bonding strip to the second surface of the unfolded portion of the first garment component such that the bonded component will effectively reduce a tendency of the seam to exhibit pucker following laundering operations.

14. In a shirt having a first component, forming a pocket of the shirt and a second component forming a front panel of the shirt, joined together in a pucker free seam as defined in claim 13 wherein:

said adhesive is composed of a thermoplastic material.

15. In a shirt having a first component, forming a pocket of the shirt and a second component forming a front panel of the shirt, joined together in a pucker free seam, as defined in claim 10 wherein:

said thermal adhesive has a melting point ranging from approximately 60 to 160 degrees celsius.

16. In a shirt having a first component, forming a pocket of the shirt and a second component forming a front panel of the shirt, joined together in a pucker free seam, as defined in claim 13 wherein:

said bonding strip is a thermal adhesive net having a density of approximately 8 to 80 grams per square meter.

17. In a shirt having a first component, forming a pocket of the shirt and a second component forming a front panel of the shirt, joined together in a pucker free seam, as defined in claim 13 wherein:

the heat and pressure process is carried out by ironing and pressing at a temperature up to 160 degrees celsius for 5 to 10 seconds.

18. In a shirt having a first component, forming a pocket of the shirt and a second component forming a front panel of the shirt, joined together in a pucker free seam, as defined in claim 13 wherein:

said bonding strip comprises a thermal adhesive web composed entirely of a thermal adhesive.

19. In a shirt having a first component, forming a pocket of the shirt and a second component forming a front panel of the shirt, joined together in a pucker free seam, as defined in claim 18 wherein:

said thermal adhesive web is composed of a plurality of adhesive filaments having a diameter ranging approximately between 20 to 80 microns.

* * * * *

Disclaimer

5,713,292 — John Wong, Montreal, Canada. PUCKER FREE POCKET GARMENT SEAM AND METHOD FOR PRODUCTION. Patent dated Feb. 03, 1998. Disclaimer filed Feb. 21, 2006 by the Assignee, Taltech, Limited.

The term of this patent, subsequent to 5,568,779, 5,590,615, 5,775,394, 5,782,191, 5,950,554, 6,070,542 and 6,079,343 has been disclaimed.

*(Official Gazette May 23, 2006)*